US012278962B2

(12) United States Patent
Horowitz et al.

(10) Patent No.: US 12,278,962 B2
(45) Date of Patent: Apr. 15, 2025

(54) DYNAMIC QUANTIZATION PARAMETER FOR ENCODING A VIDEO FRAME

(71) Applicant: Google LLC, Mountain View, CA (US)

(72) Inventors: Michael Horowitz, Austin, TX (US); Marco Paniconi, Campbell, CA (US)

(73) Assignee: GOOGLE LLC, Mountain View, CA (US)

( * ) Notice: Subject to any disclaimer, the term of this patent is extended or adjusted under 35 U.S.C. 154(b) by 276 days.

(21) Appl. No.: 17/943,683

(22) Filed: Sep. 13, 2022

(65) Prior Publication Data

US 2024/0089436 A1    Mar. 14, 2024

(51) Int. Cl.
*H04N 19/124* (2014.01)
*H04N 19/30* (2014.01)

(52) U.S. Cl.
CPC .......... *H04N 19/124* (2014.11); *H04N 19/30* (2014.11)

(58) Field of Classification Search
CPC .............................. H04N 19/124; H04N 19/30
See application file for complete search history.

(56) References Cited

U.S. PATENT DOCUMENTS

| | | |
|---|---|---|
| 9,510,004 B2 | 11/2016 | Chang et al. |
| 9,686,515 B2 * | 6/2017 | Pettersson ............ H04N 17/004 |
| 10,764,591 B2 | 9/2020 | Nagori et al. |
| 2003/0043904 A1 | 3/2003 | Naito |
| 2006/0129909 A1 | 6/2006 | Butt et al. |
| 2006/0227870 A1 | 10/2006 | Tian et al. |
| 2008/0144723 A1 | 6/2008 | Chen et al. |
| 2019/0281300 A1 | 9/2019 | Guo et al. |

OTHER PUBLICATIONS

International Search Report and Written Opinion for Application No. PCT/US2023/029204, mailed Oct. 25, 2023, 18 pages.
Lee et al., "H.263-Based SNR Scalable Video Codec", IEEE transactions on consumer electronics, vol. 43, No. 3, 1997, pp. 614-622.

* cited by examiner

Primary Examiner — Jae N Noh
(74) Attorney, Agent, or Firm — DORITY & MANNING P.A.

(57) ABSTRACT

A computer-implemented method includes setting, by a computing device, a maximum quantization parameter (QP) value for encoding an input video frame to a value which is the maximum of: a first QP value corresponding to a first proportion of an application-specified maximum QP value, or a second QP value determined based on a value which is the minimum of: a third QP value determined based on an average value of QP values used to encode a plurality of video frames before the input video frame, or a fourth QP value corresponding to a second proportion of the application-specified maximum QP value. The computer-implemented method further includes using the set maximum QP value as a quality bound for encoding the input video frame.

20 Claims, 7 Drawing Sheets

DYNAMIC QUANTIZATION PARAMETER FOR ENCODING A VIDEO FRAME

FIELD

The disclosure relates to encoding video frames which are transmitted over a computer network. More particularly, the disclosure relates to dynamically adjusting a maximum quantization parameter for encoding a video frame, for example, in the context of video processing operations of a participant computing device participating in a videoconference that is conducted via a computer network.

BACKGROUND

In video coding, the quantization parameter (QP) controls the encoder's quantization step size (QPS). A higher QP value leads to a larger quantization step size, which in turn leads to a) more distortion (i.e., lower quality), and b) a lower bit rate. For example, a maximum QP value is specified to stop the spatial quality of a video frame from dropping to unacceptable levels by preventing the encoder's rate control from increasing the QP value beyond the specified maximum QP.

Videoconferences include a system of telecommunications in which computing devices are employed in the transmission of audio and visual signals, allowing two or more people to participate in a real-time conversation from different locations.

SUMMARY

Aspects and advantages of embodiments of the disclosure will be set forth in part in the following description, or can be learned from the description, or can be learned through practice of the embodiments.

One example aspect of the disclosure is directed to a computer-implemented method which includes setting, by a computing device, a maximum quantization parameter (QP) value for encoding an input video frame to a value which is the maximum of: a first QP value corresponding to a first proportion of an application-specified maximum QP value, or a second QP value determined based on a value which is the minimum of: a third QP value determined based on an average value of QP values used to encode a plurality of video frames before the input video frame, or a fourth QP value corresponding to a second proportion of the application-specified maximum QP value. The computer-implemented method further includes using the set maximum QP value as a quality bound for encoding the input video frame.

Another example aspect of the disclosure is directed to a computing system (e.g., a participant computing device) which includes one or more processors and one or more non-transitory computer-readable media that store instructions that, when executed by the one or more processors, cause the computing system to perform operations. For example, the operations may include setting, by the one or more processors, a maximum quantization parameter (QP) value for encoding an input video frame to a value which is the maximum of: a first QP value corresponding to a first proportion of an application-specified maximum QP value, or a second QP value determined based on a value which is the minimum of: a third QP value determined based on an average value of QP values used to encode a plurality of video frames before the input video frame, or a fourth QP value corresponding to a second proportion of the application-specified maximum QP value. The method further includes using the set maximum QP value as a quality bound for encoding the input video frame.

Another example aspect of the disclosure is directed to a computer-implemented method which includes setting, by a computing device, a maximum quantization parameter (QP) value for encoding an input video frame to a value which is the maximum of: a first QP value corresponding to a first proportion of an application-specified maximum QP value, or a second QP value determined based on a value which is the minimum of: a third QP value determined based on an exponential moving average value of QP values associated with a plurality of video frames encoded before the input video frame, or a fourth QP value corresponding to a second proportion of the application-specified maximum QP value, the second proportion being greater than first proportion. The method further includes using the set maximum QP value as a quality bound for encoding the input video frame.

In one or more example embodiments, a computer-readable medium (e.g., a non-transitory computer-readable medium) which stores instructions that are executable by one or more processors of a participant computing device is provided. In some implementations the computer-readable medium stores instructions which may include instructions to cause the one or more processors to perform one or more operations of any of the methods described herein (e.g., operations of the participant computing device). The computer-readable medium may store additional instructions to execute other aspects of the participant computing device and corresponding methods of operation, as described herein.

These and other features, aspects, and advantages of various embodiments of the disclosure will become better understood with reference to the following description and appended claims. The accompanying drawings, which are incorporated in and constitute a part of this disclosure, illustrate example embodiments and, together with the description, serve to explain the related principles.

BRIEF DESCRIPTION OF THE DRAWINGS

Detailed discussion of embodiments directed to one of ordinary skill in the art is set forth in the specification, which makes reference to the appended drawings, in which.

DETAILED DESCRIPTION

Figure 1A:
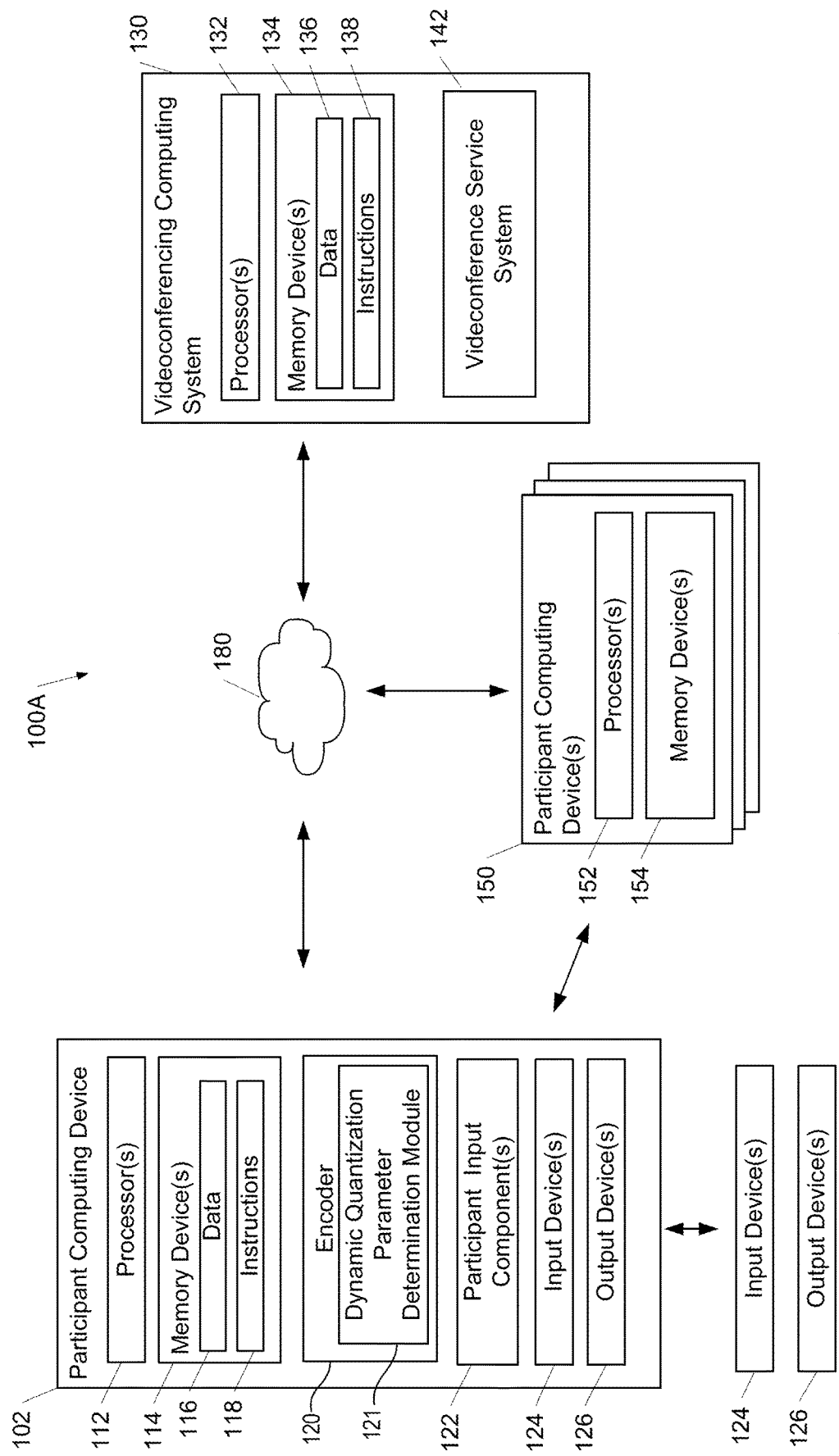
FIG. 1A depicts an example system, according to one or more example embodiments of the disclosure.

Reference now will be made to embodiments of the disclosure, one or more examples of which are illustrated in the drawings, wherein like reference characters across drawings are intended to denote like features in various implementations. Each example is provided by way of explanation of the disclosure and is not intended to limit the disclosure.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

It will be understood that when an element is referred to as being "connected" to another element, the expression encompasses an example of a direct connection or direct coupling, as well as a connection or coupling with one or more other elements interposed therebetween.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

Generally, the disclosure is directed to video processing operations of a participant computing device participating in a videoconference (which may also be referred to as a video call or videotelephony) conducted over a network. More particularly, the disclosure relates to encoding video frames generated by a participant computing device participating in a videoconference that is conducted via the cloud.

Broadcast: As used herein, broadcast or broadcasting refers to any real-time transmission of data (e.g., audio data, video data, AR/VR data, etc.) from a user device and/or from a centralized device that facilitates a videoconference (e.g., a centralized server device, etc.). For example, a broadcast may refer to the direct or indirect transmission of data from a user device to a number of other user devices. It should be noted that, in some implementations, broadcast or broadcasting can include the encoding and/or decoding of transmitted and/or received data. For example, a user device broadcasting video data may encode the video data using a codec. User devices receiving the broadcast may decode the video using the codec.

Participant: As used herein, a participant may refer to any user, group of users, device, and/or group of devices that participate in a live exchange of data (e.g., videoconference, video call, etc.). More specifically, the term participant may be used throughout the specification to refer to either user(s) or user device(s) utilized by the user(s) within the context of a videoconference. For example, a group of participants may refer to a group of users that participate remotely in a videoconference with their own user devices (e.g., smartphones, laptops, wearable devices, videoconferencing devices, broadcasting devices, etc.). As another example, a participant may refer to a group of users utilizing a single computing device for participation in a videoconference (e.g., a videoconferencing device within a meeting room, etc.). As another example, a participant may refer to a broadcasting device (e.g., webcam, microphone, etc.) unassociated with a particular user that broadcasts data to participants of a videoconference. As yet another example, a participant may refer to a bot or an automated user that participates in a videoconference to provide various services or features for other participants in the videoconference (e.g., recording data from the videoconference, providing virtual assistant services, providing testing services, etc.).

Videoconference: As used herein, a videoconference is any communication or live exchange of data (e.g., audio data, video data, AR/VR data, etc.) between a number of participants. For example, the videoconference includes multiple participants utilizing computing devices to transmit video data and/or audio data to each other in real-time. As another example, a videoconference may refer to an AR/VR conferencing service in which AR/VR data (e.g., pose data, image data, etc.) sufficient to generate a three-dimensional representation of a participant is exchanged amongst participants in real-time. As another example, a videoconference may refer to a media conference in which different types or combinations of data are exchanged amongst participants (e.g., audio data, video data, AR/VR data, a combination of audio and video data, etc.).

In the context of encoding video frames, when there is adequate available network bandwidth (e.g., above a first threshold value), the quantization parameter (QP) value typically stays well below the application specified maximum QP value. For example, different video codecs may have different application-specified maximum QP values. For example, the maximum QP value for some profiles of H.264 is 51 while the maximum QP value for AV1 is 63.

From time-to-time however, a rapid but short-lived change in video content (e.g., when a video conference participant suddenly stands up) can cause the video encoder's rate control algorithm to rapidly increase the QP value to prevent a bit rate overshoot that would otherwise be caused by the change. Having too low of a maximum QP value can cause bit rate overshoot, which can lead to unacceptable video quality due to packet loss, video freezing, etc. On the other hand, too high of a maximum QP value can lead to video with unacceptable video artifacts (e.g., blockiness).

In another context of encoding video frames, when the available network bandwidth is insufficient or barely sufficient (e.g., below a second threshold value), too low of an application specified maximum QP value can cause frequent and sustained bitrate overshoot, which can lead to unacceptable video quality due to packet loss, video freezing, etc. According to example embodiments of the disclosure, increasing the maximum QP value can be implemented as part of the video encoder's rate control algorithm to mitigate loss in video quality caused by sustained bitrate overshoot.

In the context of encoding video frames, when the video content being processed is simple (e.g., a level of motion in the background of the frame is less than a threshold value, camera noise is less than a threshold value, camera movement is less than a threshold value, etc.), implementing a low maximum QP value as part of the video encoder's rate control algorithm may be advantageous to help maintain video quality during a rapid but short-lived change in video content.

In the context of encoding video frames, when the video content being processed is complex (e.g., a level of motion in the background of the frame is greater than a threshold value, camera noise is greater than a threshold value, camera movement is greater than a threshold value, etc.), implementing a high maximum QP value as part of the video encoder's rate control algorithm can mitigate loss in video quality caused by sustained bitrate overshoot.

For example, during a videoconference when someone stands up in the video, or light changes in the background, blockiness of the image occurs for a short amount of time due in part to the QP increasing to a maximum QP which may be set higher than it needs to be and resulting in a lower quality image than an image which would be obtained if encoded using a lower maximum QP. According to aspects of the disclosure, blockiness of an image which occurs due to situations as discussed above can be mitigated by providing for a lower maximum QP which is determined dynamically based on average QP values of video frames which are previously encoded.

According to various example embodiments disclosed herein, a video encoder may encode an input video frame based on a particular maximum QP which is determined according to average QP values of video frames encoded before the input video frame. That is, the encoder uses a QP value or values that are less than or equal to the maximum QP value for encoding the video frame. The encoder uses the maximum QP value (e.g., QP_max) internally to encode the video frame at QP<=QP_max. This guarantees that the encoder will not encode the video frame at QP>QP_max, so as to provide a quality bound.

Aspects of the disclosure automatically adjust the maximum QP value for an input video frame based on average QP values of video frames received before the input video frame and can set a relatively low value for the maximum QP in some cases while in other cases set a relatively high value.

Example aspects of the disclosure are directed to a computer-implemented method which includes setting, by a computing device, a maximum quantization parameter (QP) value for encoding an input video frame to a value which is the maximum of: a first QP value corresponding to a first proportion of an application-specified maximum QP value, or a second QP value. The second QP value can be determined based on a value which is the minimum of: a third QP value determined based on an average value of QP values used to encode a plurality of video frames before the input video frame, or a fourth QP value corresponding to a second proportion of the application-specified maximum QP value. The method further includes using the set maximum QP value as a quality bound for encoding the input video frame.

The method may be implemented with respect to any motion compensated block based video encoder such as MPEG2, H.263, H.264, H.265, H.266, VP8, VP9, AV1, and the like.

For example, the first proportion of the application-specified maximum QP value and the second proportion of the application-specified maximum QP value may form a range that are percentages of the maximum QP allowed by a given video coding standard. Therefore, the method may be considered video encoder agnostic. For example, for a given video coding standard, a range (MIN_MAX_QP, MAX_MAX_QP) may be set such that the value of MIN_MAX_QP (i.e., the first QP value) is 80% of the maximum QP allowed by the given video coding standard and the value of MAX_MAX_QP (i.e., the fourth QP value) is 90% of the maximum QP allowed by the given video coding standard. For example, with respect to the VP9 video coding standard, MIN_MAX_QP may take a value of 52 and MAX_MAX_QP may take a value of 58.

For example, the third QP value may be determined based on an average value of QP values used to encode a plurality of video frames before the input video frame. In some implementations, the third QP value may be based on the average values of QP values used to encode the plurality of video frames before the input video frame and a QP value for a video frame encoded immediately before the input video frame. For example, the third QP value may be based on a first weight applied to the average values of QP values used to encode the plurality of video frames before the input video frame and a second weight applied to the QP value for the video frame (e.g., a delta or P frame) encoded immediately before the input video frame. The first weight may be greater than the second weight. As an example, the third QP value may be determined based on the following equation: avg_frame_qp=(1−a)*last_qp+a*avg_frame_qp. Here, avg_frame_qp may correspond to an exponential moving average value of QP values used to encode the plurality of video frames before the input video frame. The parameter a may be a constant value which is any value in the range of 0 to 1. For example, the parameter a may be equal to 0.8. The value of last_qp may correspond to a QP value for the video frame encoded immediately before the input video frame and the value of avg_frame_qp may correspond to average values of QP values used to encode the plurality of video frames before the input video frame (e.g., all frames before the input video frame, a predetermined number of video frames before the input video frame, video frames encoded within a predetermined period of time before the input video frame).

The maximum QP value for encoding the input video frame may be determined according to the following equation: max_qp=max(min(c*avg_frame_qp, MAX_MAX_QP), MIN_MAX_QP). Here, the second QP value corresponds to the minimum of c*avg_frame_qp and MAX_MAX_QP. The parameter c may be a constant value which is any value greater than 1. For example, the parameter c may be equal to 1.1.

For example, where the video encoder encodes multiple spatial and/or multiple temporal layers, separate avg_frame_qp and max_qp values may be determined for each spatial-temporal layer.

Examples of determining a max_qp under various conditions are described below. For example, in one circumstance an average QP value (avg_frame_qp) can be well below a MIN_MAX_QP. As example values, assuming the avg_frame_qp is equal to 30, c=1.1, MIN_MAX_QP is equal to 50, and MAX_MAX_QP is equal to 60, the max_qp may be determined to be equal to MIN_MAX_QP (50).

For example, in a second circumstance an average QP value (avg_frame_qp) can be closer to the MIN_MAX_QP. As example values, assuming the avg_frame_qp is equal to 50, c=1.1, MIN_MAX_QP is equal to 50, and MAX_MAX_QP is equal to 60, the max_qp may be determined to be equal to c*avg_frame_qp or 55. Increasing the maximum QP value in this instance (e.g., from 50 to 55) creates separation between the average frame QP of 50 and the maximum QP value.

For example, in a third circumstance an average QP value (avg_frame_qp) may be above the MAX_MAX_QP. As example values, assuming the avg_frame_qp is equal to 62, c=1.1, MIN_MAX_QP is equal to 50, and MAX_MAX_QP is equal to 60, the max_qp may be determined to be equal to MAX_MAX_QP (60).

Another example aspect of the disclosure is directed to a computing system (e.g., a participant computing device participating in a videoconferencing session) which includes one or more processors and one or more non-transitory computer-readable media that store instructions that, when executed by the one or more processors, cause the computing system to perform operations. For example, the operations may include setting a maximum quantization parameter (QP) value for encoding an input video frame to a value which is the maximum of: a first QP value corresponding to a first proportion of an application-specified maximum QP value, or a second QP value. The second QP value can be determined based on a value which is the minimum of: a third QP value determined based on an average value of QP values used to encode a plurality of video frames before the input video frame, or a fourth QP value corresponding to a second proportion of the application-specified maximum QP value. The operations further includes using the set maximum QP value as a quality bound for encoding the input video frame.

According to example embodiments disclosed herein, a computing device is configured to reduce or prevent distracting video artifacts such as blockiness that may be caused by a person appearing in a video standing up. The computing device includes an encoder which is configured to set a maximum quantization parameter (QP) for an input video frame based on an average value of QP values used to encode a plurality of video frames before the input video frame video frames. In video coding, the QP controls the tradeoff between video quality and encoded bit rate. For a given encoder, a larger QP value results in lowering the bit rate and lowering the video quality. Conversely, as the QP value becomes smaller, the bit rate and video quality increase. Limiting the maximum QP value can result in a higher video quality and higher bit rate.

The disclosure provides numerous technical effects and benefits. Processing of video frames, for example for a participant computing device participating in a videoconferencing session, can result in a blocky image when someone stands up in the video, or light changes in the background, due in part to the QP increasing to a maximum QP which may be set higher than it needs to be, resulting in a lower quality image than an image which is encoded using a lower maximum QP, as is provided for according examples of the disclosure. That is, according to aspects of the disclosure, blockiness of an image which occurs due to situations as discussed above can be mitigated by automatically and dynamically setting a lower maximum QP based on average QP values of video frames which are previously encoded. Thus, aspects of the disclosure can mitigate the problem of needing to manually set a maximum QP value for a video encoder that preserved video quality without causing network congestion.

With reference now to the drawings, example embodiments of the disclosure will be discussed in further detail.

FIG. 1A depicts a block diagram of an example computing system 100A that performs encoding operations with respect to a predetermined type of video frame (e.g., a keyframe) according to example embodiments of the disclosure. The computing system 100A includes a participant computing device 102 that is associated with a participant in a videoconference, a videoconferencing computing system 130, and, in some implementations, one or more other participant computing devices 150 respectively associated with one or more other participants in the videoconference.

The participant computing device 102 can be any type of computing device, such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The participant computing device 102 includes one or more processors 112 and one or more memory devices 114. The one or more processors 112 can be any suitable processing device (e.g., a processor core, a microprocessor, an ASIC, an FPGA, a controller, a microcontroller, etc.) and can be one processor or a plurality of processors that are operatively connected (e.g., in parallel). The one or more memory devices 114 can include one or more non-transitory computer-readable storage media, such as RAM, ROM, EEPROM, EPROM, flash memory devices, magnetic disks, etc., and combinations thereof. The one or more memory devices 114 can store data 116 and instructions 118 which are executed by the one or more processors 112 to cause the participant computing device 102 to perform operations.

The participant computing device 102 includes an encoder 120 to encode video frames which are broadcast or transmitted to the videoconferencing computing system 130 and/or to the one or more other participant computing devices 150 for conducting the videoconference. The encoder 120 may include various codecs to encode the video frames. Example video codecs may include VP8, VP9, AV1, HEVC, H.264 and the like. For example, according to one or more examples of the disclosure, the encoder 120 may include a dynamic maximum quantization parameter determination module 121 which is configured to set a maximum QP value to ensure or improve video quality or to avoid packet loss, video freezing, etc. Operations of the encoder 120 and dynamic maximum quantization parameter determination module 121 are described in more detail herein.

The participant computing device 102 can also include one or more participant input components 122 that receive a user input. For example, the one or more participant input components 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example participant input components include a microphone, a traditional keyboard, or other devices by which a participant can provide user input.

In some implementations, the participant computing device 102 can include, or can be communicatively coupled to, one or more input devices 124. For example, the one or more input devices 124 may include a camera device configured to capture video data of a user of the participant computing device 102 (e.g., for broadcast, etc.). In some implementations, the one or more input devices 124 may include a plurality of camera devices communicatively coupled to the participant computing device 102 that are configured to capture image data from different poses for generation of three-dimensional representations (e.g., a representation of a user of the participant computing device 102, etc.). In some implementations, the one or more input devices 124 may include audio capture devices, such as microphones. In some implementations, the one or more input devices 124 may include sensor devices configured to capture sensor data indicative of movements and/or locations of a user of the participant computing device 102 (e.g., accelerometer(s), Global Positioning Satellite (GPS) sensor(s), gyroscope(s), infrared sensor(s), head tracking sensor(s) such as magnetic capture system(s), an omni-directional treadmill device, sensor(s) configured to track eye movements of the user, etc.).

In some implementations, the participant computing device 102 can include, or be communicatively coupled to, one or more output devices 126. The one or more output devices 126 can be, or otherwise include, a device configured to output audio data, image data, video data, etc. For example, the one or more output devices 126 may include a display device (e.g., a television, projector, smartphone display device, etc.) and a corresponding audio output device (e.g., speakers, headphones, etc.). As another example, the one or more output devices 126 may include display devices for an augmented reality device or virtual reality device.

The videoconferencing computing system 130 includes one or more processors 132 and one or more memory devices 134. The one or more processors 132 can be any suitable processing device (e.g., a processor core, a microprocessor, an ASIC, an FPGA, a controller, a microcontroller, etc.) and can be one processor or a plurality of processors that are operatively connected (e.g., in parallel). The one or more memory devices 134 can include one or more non-transitory computer-readable storage media, such as RAM, ROM, EEPROM, EPROM, flash memory devices, magnetic disks, etc., and combinations thereof. The one or more memory devices 134 can store data 136 and instructions 138 which are executed by the one or more processors 132 to cause the videoconferencing computing system 130 to perform operations.

In some implementations, the videoconferencing computing system 130 includes or is otherwise implemented by one or more server computing devices. In instances in which the videoconferencing computing system 130 includes plural server computing devices, such server computing devices can operate according to sequential computing architectures, parallel computing architectures, or some combination thereof.

In some implementations, the videoconferencing computing system 130 can receive data of various types from the participant computing device 102 and the one or more other participant computing devices 150 (e.g., via the network 180, etc.). For example, in some implementations, the participant computing device 102 can capture video data, audio data, multimedia data (e.g., video data and audio data, etc.), sensor data, etc. and transmit such data to the videoconferencing computing system 130. The videoconferencing computing system 130 may receive the data (e.g., via the network 180).

In some implementations, the videoconferencing computing system 130 may receive data from the participant computing device 102 and the one or more other participant computing devices 150, according to various encryption scheme(s) (e.g., codec(s), lossy compression scheme(s), lossless compression scheme(s), etc.). For example, the participant computing device 102 may encode video data with a video codec via encoder 120, and then transmit the encoded video data to the videoconferencing computing system 130. In some implementations, the participant computing device 102 may encode video data with the video codec via encoder 120, and then transmit the encoded video data to the one or more other participant computing devices 150 directly, or indirectly via the videoconferencing computing system 130 or indirectly via another server system. The video codec implemented by the encoder 120 and dynamic maximum quantization parameter determination module 121 may encode frames such as keyframes and delta frames and may include MPEG2, H.263, H.264, H.265, H.266, VP8, VP9, AV1, HEVC, and the like. The videoconferencing computing system 130 and the one or more other participant computing devices 150 may decode the encoded video data with the corresponding video codec. In some implementations, the participant computing device 102 may dynamically select between a number of different codecs with varying degrees of loss based on conditions of the network 180, the participant computing device 102, the one or more other participant computing devices 150, and/or the videoconferencing computing system 130. For example, the participant computing device 102 may dynamically switch from video data transmission according to a lossy encoding scheme to video data transmission according to a lossless encoding scheme based on a signal strength between the participant computing device 102 and the network 180.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the videoconferencing computing system 130 may include a videoconferencing service system 142. The videoconferencing service system 142 may be configured to facilitate videoconferencing services for multiple participants. For example, the videoconferencing service system 142 may receive and broadcast data (e.g., video data, audio data, etc.) between the participant computing device 102 and one or more other participant computing devices 150. A videoconferencing service can be any type of application or service that receives and broadcasts data from multiple participants. For example, in some implementations, the videoconferencing service may receive data (e.g., audio data, video data, both audio and video data, etc.) from some participants and broadcasts such data to other participants.

As an example, the videoconferencing service system 142 can provide a videoconference service to multiple participants. One of the participants can transmit audio and video data to the videoconferencing service system 142 using a user device (e.g., a participant computing device 102, etc.). A different participant can transmit audio data to the videoconferencing service system 142 with a user device. The videoconferencing service system 142 can receive the data from the participants and broadcast the data to each user device of the multiple participants.

As another example, the videoconferencing service system 142 may implement an augmented reality (AR) or virtual reality (VR) conferencing service for multiple participants. One of the participants can transmit AR/VR data sufficient to generate a three-dimensional representation of the participant to the videoconferencing service system 142 via a device (e.g., video data, audio data, sensor data indicative of a pose and/or movement of a participant, etc.). The videoconferencing service system 142 can transmit the AR/VR data to devices of the other participants. In such fashion, the videoconferencing service system 142 can facilitate any type or manner of videoconferencing services to multiple participants.

It should be noted that the videoconferencing service system 142 may facilitate the flow of data between participants (e.g., participant computing device 102, the one or more other participant computing devices 150, etc.) in any manner that is sufficient to implement the videoconferencing service. In some implementations, the videoconferencing service system 142 may be configured to receive data from participants, decode the data, encode the data, broadcast the data to other participants, etc. For example, the videoconferencing service system 142 may receive encoded video data from the participant computing device 102. The videoconferencing service system 142 can decode the video data according to a video codec utilized by the participant computing device 102. The videoconferencing service system 142 can encode the video data with a video codec and broadcast the data to participant computing devices.

Additionally, or alternatively, in some implementations, the videoconferencing service system 142 can facilitate peer-to-peer videoconferencing services between participants. For example, in some implementations, the videoconferencing service system 142 may dynamically switch between provision of server-side videoconferencing services and facilitation of peer-to-peer videoconferencing services based on various factors (e.g., network load, processing load, requested quality, etc.).

The participant computing device 102 can receive data broadcast from the videoconferencing service system 142 of videoconferencing computing system 130 as part of a videoconferencing service (video data, audio data, etc.). In some implementations, the participant computing device 102 can upscale or downscale the data (e.g., video data) based on a role associated with the data. For example, the data may be video data associated with a participant of the participant computing device 102 that is assigned an active speaker role. The participant computing device 102 can upscale the video data associated with the participant in the active speaker role for display in a high-resolution display region (e.g., a region of the one or more output devices 126). For another example, the video data may be associated with a participant with a non-speaker role. The participant computing device 102 can downscale the video data associated with the participant in the non-speaker role using a downscaling algorithm (e.g., lanczos filtering, Spline filtering, bilinear interpolation, bicubic interpolation, etc.) for display in a low-resolution display region. In some implementations, the roles of participants associated with video data can be signaled to computing devices (e.g., participant computing device 102, the one or more other participant computing devices 150, etc.) by the videoconferencing service system 142 of the videoconferencing computing system 130.

The videoconferencing computing system 130 and the participant computing device 102 can communicate with the one or more other participant computing devices 150 via the network 180. The one or more other participant computing devices 150 can be any type of computing device(s), such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The one or more other participant computing devices 150 includes one or more processors 152 and one or more memory device 154 as described with regards to the participant computing device 102. In some implementations, the one or more other participant computing devices 150 can be substantially similar to, or identical to, the participant computing device 102. Alternatively, in some implementations, the one or more other participant computing devices 150 may be different devices than the participant computing device 102 that can also facilitate videoconferencing with the videoconferencing computing system 130. For example, the participant computing device 102 may be a laptop and the one or more other participant computing devices 150 may be smartphone(s).

In some implementations the dynamic maximum quantization parameter determination module 121 may be configured to set the maximum QP value that is applied to a video frame according to average QP values of video frames encoded before the input video frame. That is, the dynamic maximum quantization parameter determination module 121 may be configured to use a QP value or values that are less than or equal to the maximum QP value for encoding the video frame. The encoder uses the maximum QP value (e.g., QP_max) internally to encode the video frame at QP<=QP_max. This guarantees that the encoder will not encode the video frame at QP>QP_max, so as to provide a quality bound.

For example, the dynamic maximum quantization parameter determination module 121 may be configured to set a maximum QP value for encoding an input video frame to a value which is the maximum of: a first QP value corresponding to a first proportion of an application-specified maximum QP value, or a second QP value. The second QP value can be determined by the dynamic maximum quantization parameter determination module 121 based on a value which is the minimum of: a third QP value determined based on an average value of QP values used to encode a plurality of video frames before the input video frame, or a fourth QP value corresponding to a second proportion of the application-specified maximum QP value. The dynamic maximum quantization parameter determination module 121 may be further configured to encode the input video frame using the set maximum QP value (e.g., as the quality bound).

The dynamic maximum quantization parameter determination module 121 may be configured to set the maximum QP value with respect to any motion compensated block based video encoder such as MPEG2, H.263, H.264, H.265, H.266, VP8, VP9, AV1, and the like.

For example, the first proportion of the application-specified maximum QP value and the second proportion of the application-specified maximum QP value may form a range that are percentages of the maximum QP allowed by a given video coding standard. Therefore, the method implemented by the dynamic maximum quantization parameter determination module 121 may be considered video encoder agnostic. For example, for a given video coding standard, a range (MIN_MAX_QP, MAX_MAX_QP) may be set such that the value of MIN_MAX_QP (i.e., the first QP value) is 80% of the maximum QP allowed by the given video coding standard and the value of MAX_MAX_QP (i.e., the fourth QP value) is 90% of the maximum QP allowed by the given video coding standard. For example, with respect to the VP9 video coding standard, MIN_MAX_QP may take a value of 52 and MAX_MAX_QP may take a value of 58.

For example, the third QP value may be determined by the dynamic maximum quantization parameter determination module 121 based on an average value of QP values used to encode a plurality of video frames before the input video frame. In some implementations, the third QP value may be based on the average values of QP values used to encode the plurality of video frames before the input video frame and a QP value for a video frame encoded immediately before the input video frame. For example, the third QP value may be based on a first weight applied to the average values of QP values used to encode the plurality of video frames before the input video frame and a second weight applied to the QP value for the video frame (e.g., a delta or P frame) encoded immediately before the input video frame. The first weight may be greater than the second weight. As an example, the dynamic maximum quantization parameter determination module 121 may be configured to determine the third QP value based on the following equation: avg_frame_qp=(1−a)*last_qp+a*avg_frame_qp. Here, avg_frame_qp may correspond to an exponential moving average value of QP values used to encode the plurality of video frames before the input video frame. The parameter a may be a constant value which is any value in the range of 0 to 1. For example, the parameter a may be equal to 0.8. The value of last_qp may correspond to a QP value for the video frame (e.g., a delta or P frame) encoded immediately before the input video frame and the value of avg_frame_qp may correspond to average values of QP values used to encode the plurality of video frames before the input video frame (e.g., all frames before the input video frame, a predetermined number of video frames before the input video frame, video frames encoded within a predetermined period of time before the input video frame).

For example, the average value of QP values used to encode video frames preceding the input video frame may be determined according to an average value of QP values used to encode a predetermined number of video frames immediately preceding the input video frame such as 10 frames, 20 frames, 30 frames, etc. As another example, the average value of QP values used to encode video frames preceding the input video frame may be determined according to an average value of QP values used to encode video frames preceding the input video frame within a predetermined period of time before the input video frame is encoded such as video frames which are encoded within one second, one-half second, one-third second, etc., before the input video frame.

The dynamic maximum quantization parameter determination module 121 may be configured to determine the maximum QP value for encoding the input video frame according to the following equation: max_qp=max(min (c*avg_frame_qp, MAX_MAX_QP), MIN_MAX_QP). Here, the second QP value corresponds to the minimum of c*avg_frame_qp and MAX_MAX_QP. The parameter c may be a constant value which is any value greater than 1. For example, the parameter c may be equal to 1.1.

For example, the dynamic maximum quantization parameter determination module 121 may be configured to encode multiple spatial and/or multiple temporal layers. Layered coding involves multiple data streams or layers which are created when compressing an original video stream (e.g., layers having different qualities such as spatial resolution, temporal resolutions, etc.). The dynamic maximum quantization parameter determination module 121 may be configured to determine separate avg_frame_qp and max_qp values for each spatial-temporal layer when the input video frame is included in a video bitstream that contains a plurality of layers.

Examples of determining a max_qp under various conditions are described below. For example, in one circumstance an average QP value (avg_frame_qp) can be well below a MIN_MAX_QP. As example values, assuming the avg_frame_qp is equal to 30, c=1.1, MIN_MAX_QP is equal to 50, and MAX_MAX_QP is equal to 60, the dynamic maximum quantization parameter determination module 121 may determine max_qp to be equal to MIN_MAX_QP (50).

For example, in a second circumstance an average QP value (avg_frame_qp) can be closer to the MIN_MAX_QP. As example values, assuming the avg_frame_qp is equal to 50, c=1.1, MIN_MAX_QP is equal to 50, and MAX_MAX_QP is equal to 60, the dynamic maximum quantization parameter determination module 121 may be configured to determine the max_qp to be equal to c*avg_frame_qp or 55. Increasing the maximum QP value in this instance (e.g., from 50 to 55) creates separation between the average frame QP of 50 and the maximum QP value.

For example, in a third circumstance an average QP value (avg_frame_qp) may be above the MAX_MAX_QP. As example values, assuming the avg_frame_qp is equal to 62, c=1.1, MIN_MAX_QP is equal to 50, and MAX_MAX_QP is equal to 60, the dynamic maximum quantization parameter determination module 121 may be configured to determine the max_qp to be equal to MAX_MAX_QP (60). In this circumstance the max_qp can be capped so that a quality of the video is not reduced too far.

Figure 1B:
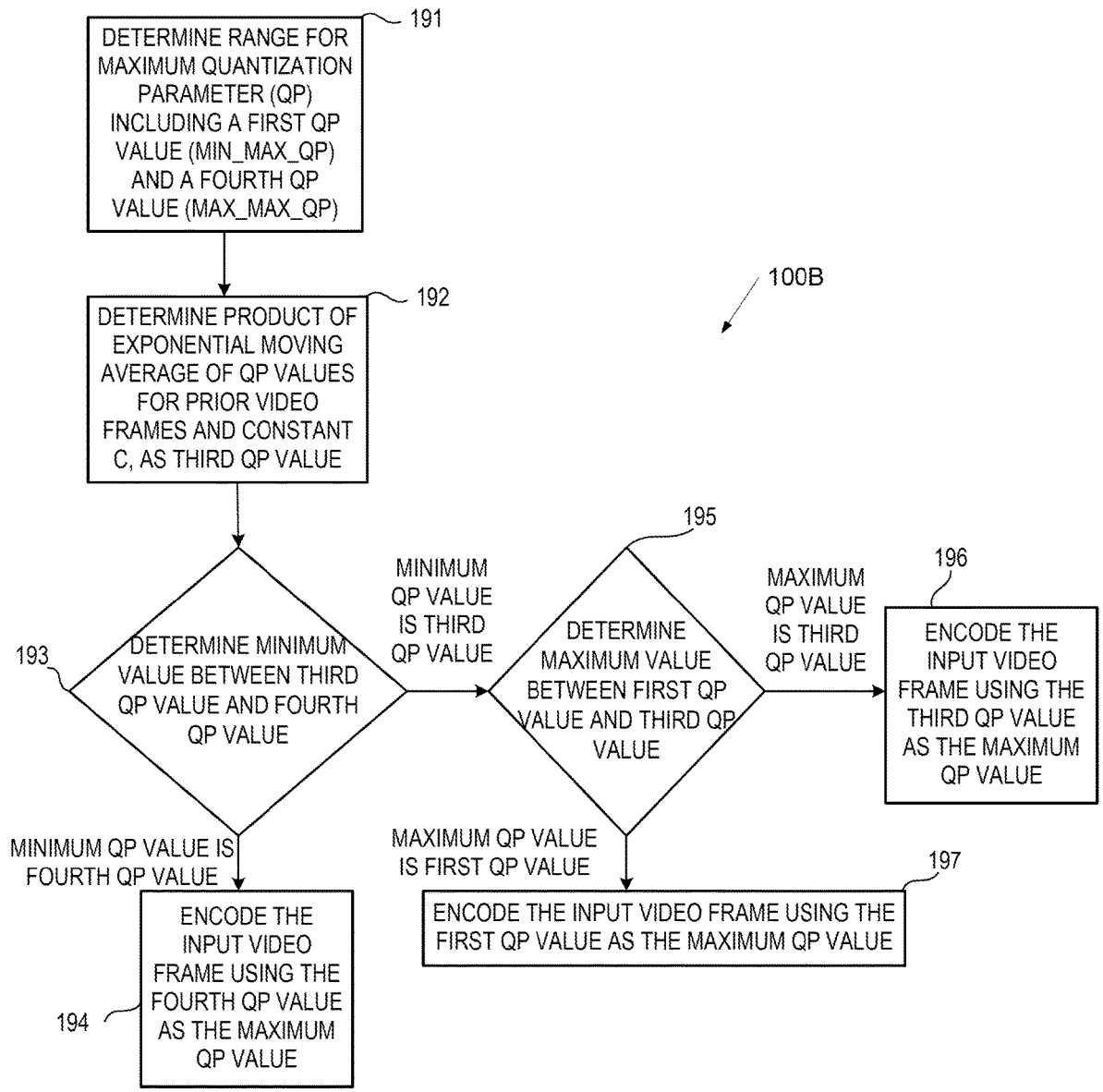
FIG. 1B illustrates an example flow diagram of a non-limiting computer-implemented method according to one or more example embodiments of the disclosure.

A method for implementing operations of the dynamic maximum quantization parameter determination module 121 is depicted in FIG. 1B which illustrates a flow chart diagram of a non-limiting computer-implemented method according to one or more example embodiments of the disclosure. Although FIG. 1B depicts operations performed in a particular order for purposes of illustration and discussion, the methods of the disclosure are not limited to the particularly illustrated order or arrangement and some operations can be performed in parallel or substantially simultaneously. The various operations of the method 100B can be omitted, rearranged, combined, and/or adapted in various ways without deviating from the scope of the disclosure.

The method 100B may be implemented by the dynamic maximum quantization parameter determination module 121 of the participant computing device 102, for example, when a video frame is to be generated and encoded, and subsequently transmitted to the one or more other participant computing devices 150 and/or the videoconferencing computing system 130.

For example, at 191 the dynamic maximum quantization parameter determination module 121 may be configured to determine a range for a maximum quantization parameter (QP) including a first QP value (MIN_MAX_QP) and a fourth QP value (MAX_MAX_QP). For example, for a given video coding standard, the first QP value may be a first proportion (e.g., ⅘ or 80%) of the application-specified maximum QP value for that video coding standard, and the fourth QP value may be a second proportion (e.g., 9/10 or 90%) of the application-specified maximum QP value for that video coding standard. For example, with respect to the VP9 video coding standard, the first QP value (MIN_MAX_QP) may take a value of 52 and the fourth QP value (MAX_MAX_QP) may take a value of 58.

For example, at 192 the dynamic maximum quantization parameter determination module 121 may be configured to determine a product of an exponential moving average of QP values for prior video frames and a constant c as the third QP value. As an example, the dynamic maximum quantization parameter determination module 121 may be configured to determine the third QP value based on the following equation: avg_frame_qp=(1−a)*last_qp+a*avg_frame_qp. Here, avg_frame_qp may correspond to an exponential moving average value of QP values used to encode the plurality of video frames before the input video frame. The parameter a may be a constant value which is any value in the range of 0 to 1. For example, the parameter a may be equal to 0.8. The value of last_qp may correspond to a QP value for the video frame encoded immediately before the input video frame and the value of avg_frame_qp may correspond to average values of QP values used to encode the plurality of video frames before the input video frame (e.g., all frames before the input video frame, a predetermined number of video frames before the input video frame, video frames encoded within a predetermined period of time before the input video frame).

At 193, the dynamic maximum quantization parameter determination module 121 may be configured to determine a minimum QP value between the third QP value and fourth QP value (i.e., min(c*avg_frame_qp, MAX_MAX_QP)). If the minimum QP value is determined by the dynamic maximum quantization parameter determination module 121 to be the fourth QP value, at 194 the dynamic maximum quantization parameter determination module 121 may be configured to determine the maximum QP value as the fourth QP value (MAX_MAX_QP as MAX_MAX_QP is greater than MIN_MAX_QP).

If the minimum QP value at 193 is determined by the dynamic maximum quantization parameter determination module 121 to be the third QP value, at 195 the dynamic maximum quantization parameter determination module 121 may be configured to determine the maximum QP value between the first QP value and the third QP value (max (c*avg_frame_qp, MIN_MAX_QP). If the maximum QP value is determined by the dynamic maximum quantization parameter determination module 121 to be the third QP value, at 196 the dynamic maximum quantization parameter determination module 121 may be configured to encode the input video frame using the third QP value (c*avg_frame_qp) as the maximum QP value. If the maximum QP value is determined by the dynamic maximum quantization parameter determination module 121 to be the first QP value, at 197 the dynamic maximum quantization parameter determination module 121 may be configured to encode the input video frame using the first QP value (MIN_MAX_QP) as the maximum QP value.

As mentioned above, the video codec implemented by the encoder 120 and dynamic maximum quantization parameter determination module 121 to encode frames such as keyframes, delta frames, P frames, etc. may include MPEG2, H.263, H.264, H.265, H.266, VP8, VP9, AV1, and the like. Different video codecs may have different application-specified maximum QP values. For example, the maximum QP value for some profiles of H.264 is 51 while the maximum QP value for AV1 is 63. In some implementations, internal values may be utilized The values of MIN_MAX_QP and MAX_MAX_QP may be determined according to preset proportions of an application-specified maximum QP value for a respective video codec.

Figure 2:
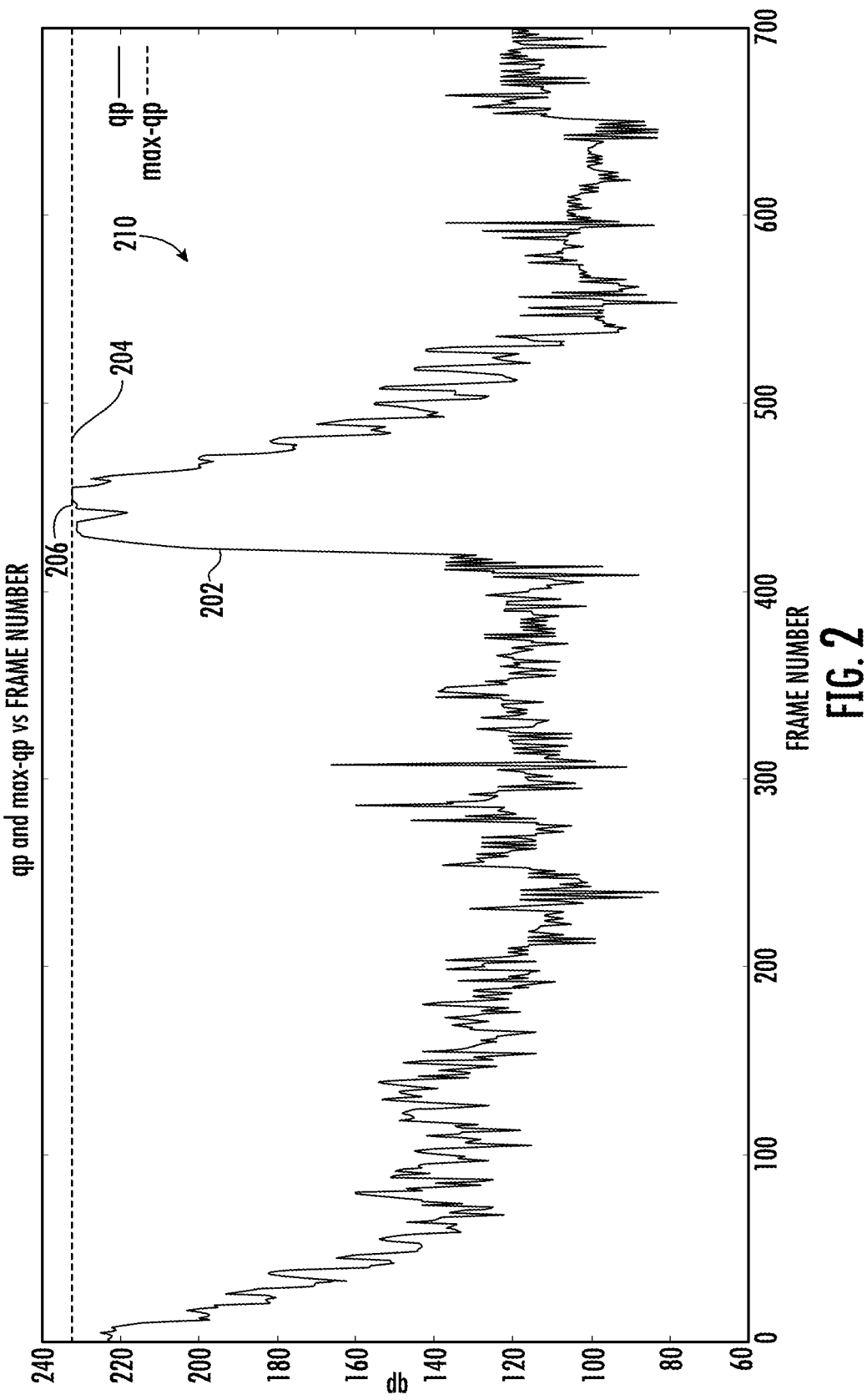
FIG. 2 depicts an example graph illustrating encoding results for processing video frames from a first test video, according to one or more example embodiments of the disclosure.

FIG. 2 depicts an example graph illustrating encoding results for processing video frames from a first test video, according to one or more example embodiments of the disclosure.

Referring to FIG. 2, the first test video (encoded using the VP9 video coding standard) relates to a video in which motion is generally steady or stationary with a short burst of high motion occurring after frame number 400 as annotated generally by reference character 202. In the example of FIG. 2, a fixed max_qp mode is implemented where the max_qp is set to a relatively high value of 58 (an internal value of 232) as indicated by reference character 204. As can be seen from the graph 210 of FIG. 2, when the short burst of high motion occurs the QP value rapidly increases to a peak 206 near or at the max_qp value of 58. In this example, the max_qp value may be set too high (or set unnecessarily high) which can result in poor video quality.

Figure 3:
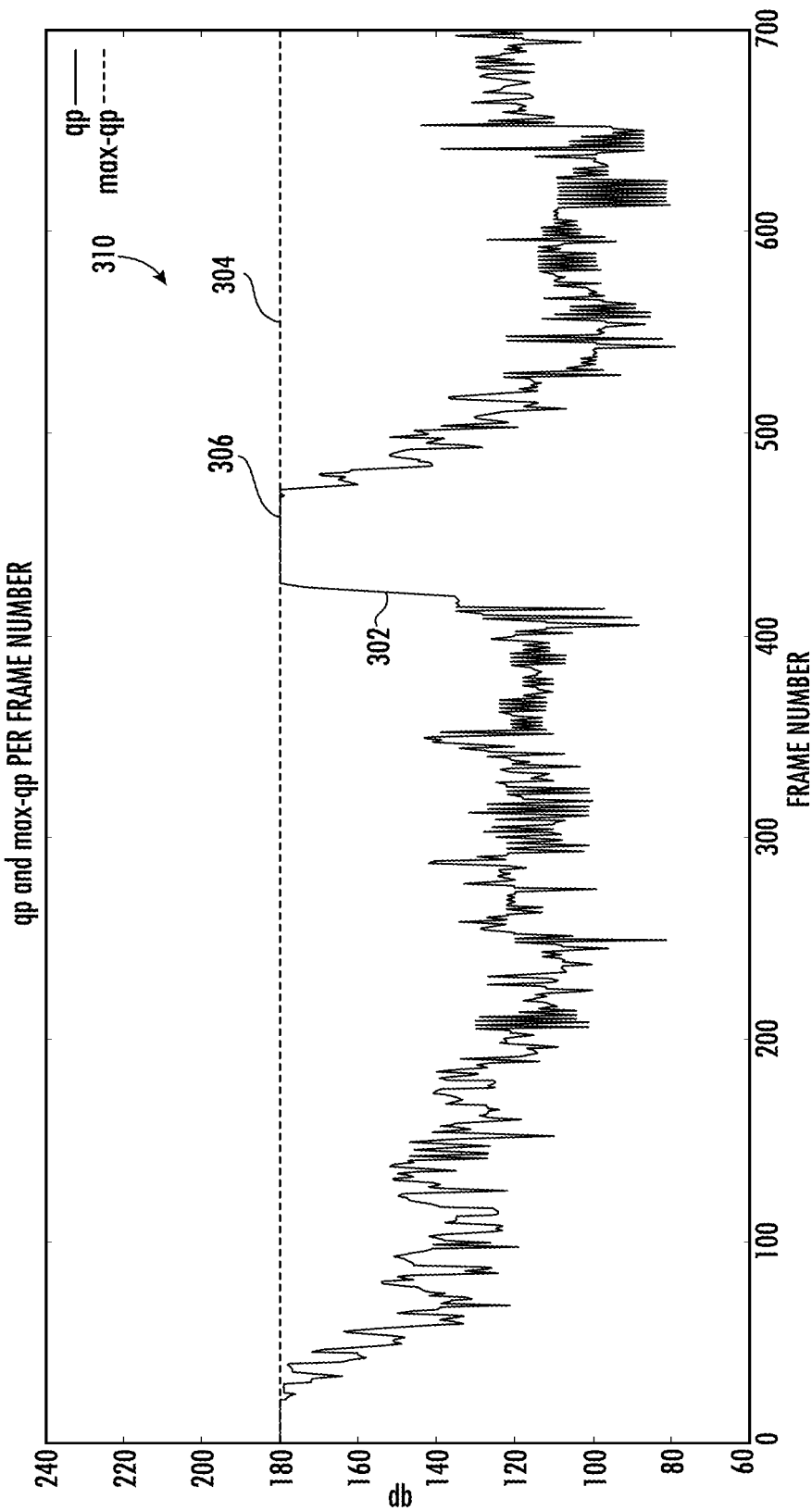
FIG. 3 depicts an example graph illustrating encoding results for processing video frames from the first test video, according to one or more example embodiments of the disclosure.

FIG. 3 depicts an example graph illustrating encoding results for processing video frames from the first test video, according to one or more example embodiments of the disclosure.

In the example of FIG. 3, a fixed max_qp mode is implemented where the max_qp is set to a relatively low value of 45 (an internal value of 180) as indicated by reference character 304. As can be seen from the graph 310 of FIG. 3, when the short burst of high motion occurs (annotated generally by reference character 302) the QP value rapidly increases to a peak 306 at the max_qp value of 45 which causes a large overshoot and dropping of frames. In this example, the max_qp value may be set too low which can result in frames being dropped from the video and/or video freezing.

Figure 4:
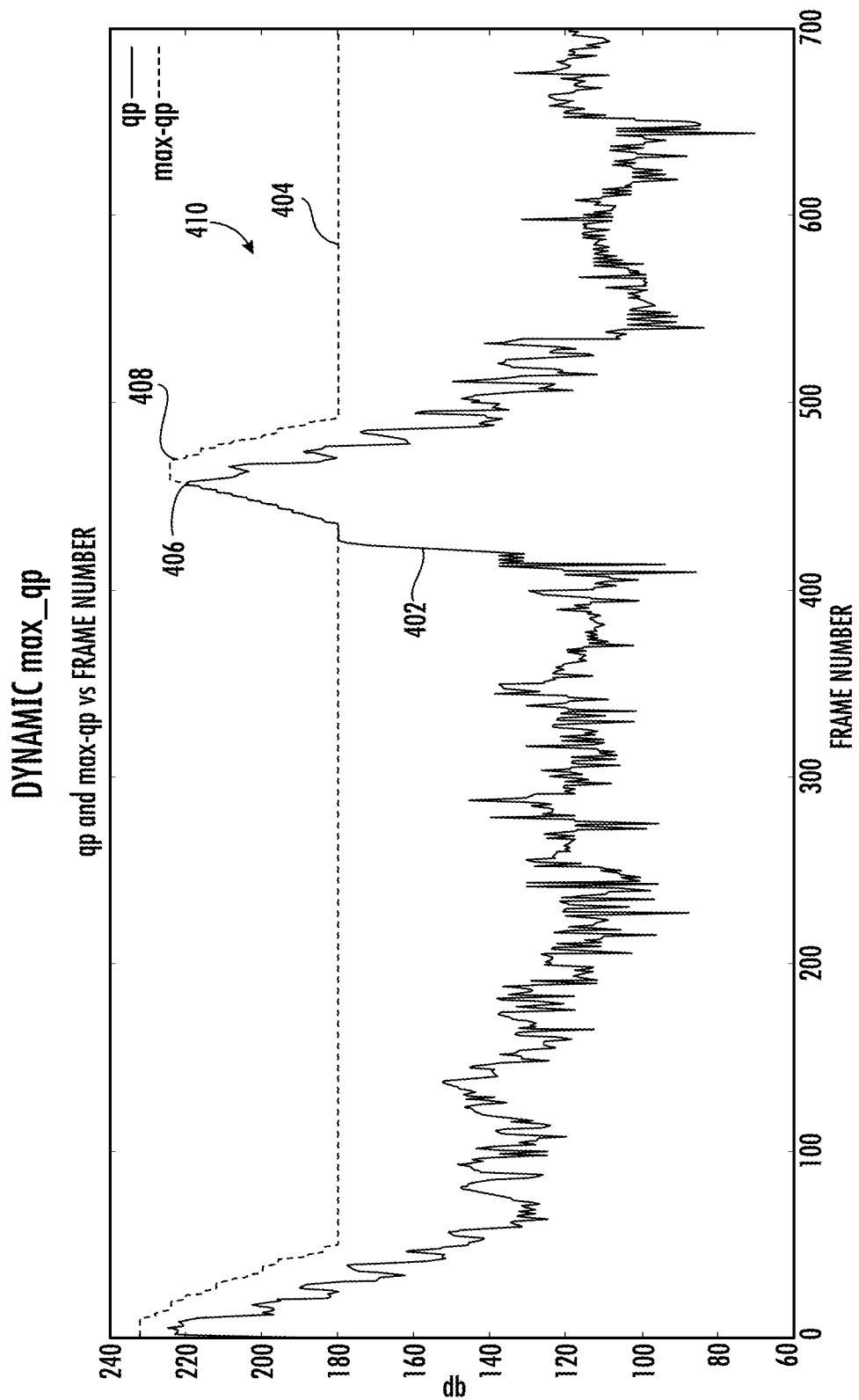
FIG. 4 depicts an example graph illustrating encoding results for processing video frames from the first test video, according to one or more example embodiments of the disclosure.

FIG. 4 depicts an example graph illustrating encoding results for processing video frames from the first test video, according to one or more example embodiments of the disclosure.

In the example of FIG. 4, a dynamic max_qp mode is implemented by the dynamic maximum quantization parameter determination module 121 where the max_qp is set according to the method disclosed herein and the maximum QP value varies. For example, the dynamic maximum quantization parameter determination module 121 may determine the range (MIN_MAX_QP, MAX_MAX_QP) to be (45, 58), set the constant a equal to 0.9, and set the constant c equal to 1.1. According to the dynamic max_qp mode implemented in FIG. 4, for the majority of the first test video (e.g., where the content is generally stationary and/or the camera is steady) the max_qp value takes a value of 45 (an internal value of 180) which corresponds to the MIN_MAX_QP value of 45, as indicated by reference character 404 and a differential between the QP values used to encode the video frame and the max_qp value is sufficient so as to avoid poor quality of the video. As can be seen from the graph 410 of FIG. 4, when the short burst of high motion occurs (annotated generally by reference character 402) the QP value rapidly increases to a peak 406 while the max_qp value dynamically changes from MIN_MAX_QP value of 45 to the MAX_MAX_QP value of 58 as indicated by reference character 408. The example of FIG. 4 illustrates a beneficial tradeoff of allowing the QP value to increase (beyond the MIN_MAX_QP value) so as to avoid an overshoot and dropping of frames while providing a sufficient differential between the QP value and MAX_MAX_QP value of 58 so as to avoid a poor quality of the video.

Figure 5:
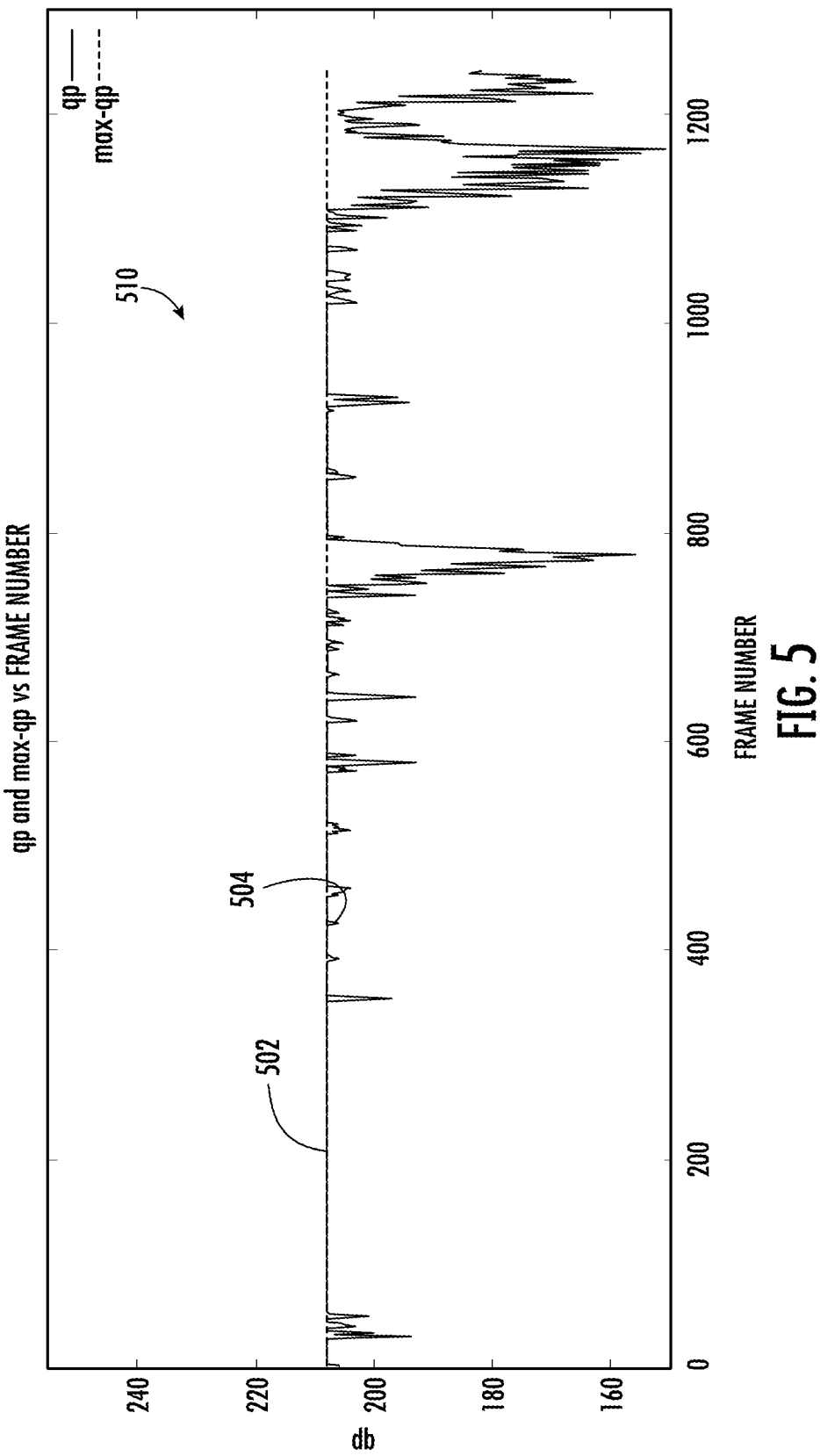
FIG. 5 depicts an example graph illustrating encoding results for processing video frames from a second test video, according to one or more example embodiments of the disclosure.

FIG. 5 depicts an example graph illustrating encoding results for processing video according to a second test video, according to one or more example embodiments of the disclosure.

Referring to FIG. 5, the second test video (encoded using the VP9 video coding standard) relates to a video in which available network bandwidth is insufficient (or barely sufficient), and a low maximum QP value can cause frequent and sustained bitrate overshoot, which can lead to unacceptable video quality due to packet loss, video freezing, etc. That is, in a fixed max_qp implementation the encoder may struggle to satisfy a bit rate requirement where the target bit rate is low for the content being encoded. In this example, increasing the maximum QP value would mitigate loss in video quality caused by sustained bitrate overshoot.

In the example of FIG. 5, a fixed max_qp mode is implemented where the max_qp is set to a value of 52 (an internal value of 208) as indicated by reference character 502. As can be seen from the graph 510 of FIG. 5, for much of the second test video the QP value takes a value close to or at the max_qp value of 52, and thus hits the max_q ceiling. This can cause poor rate control and frequent and sustained bitrate overshoot, which can lead to unacceptable video quality due to packet loss, video freezing, etc.

Figure 6:
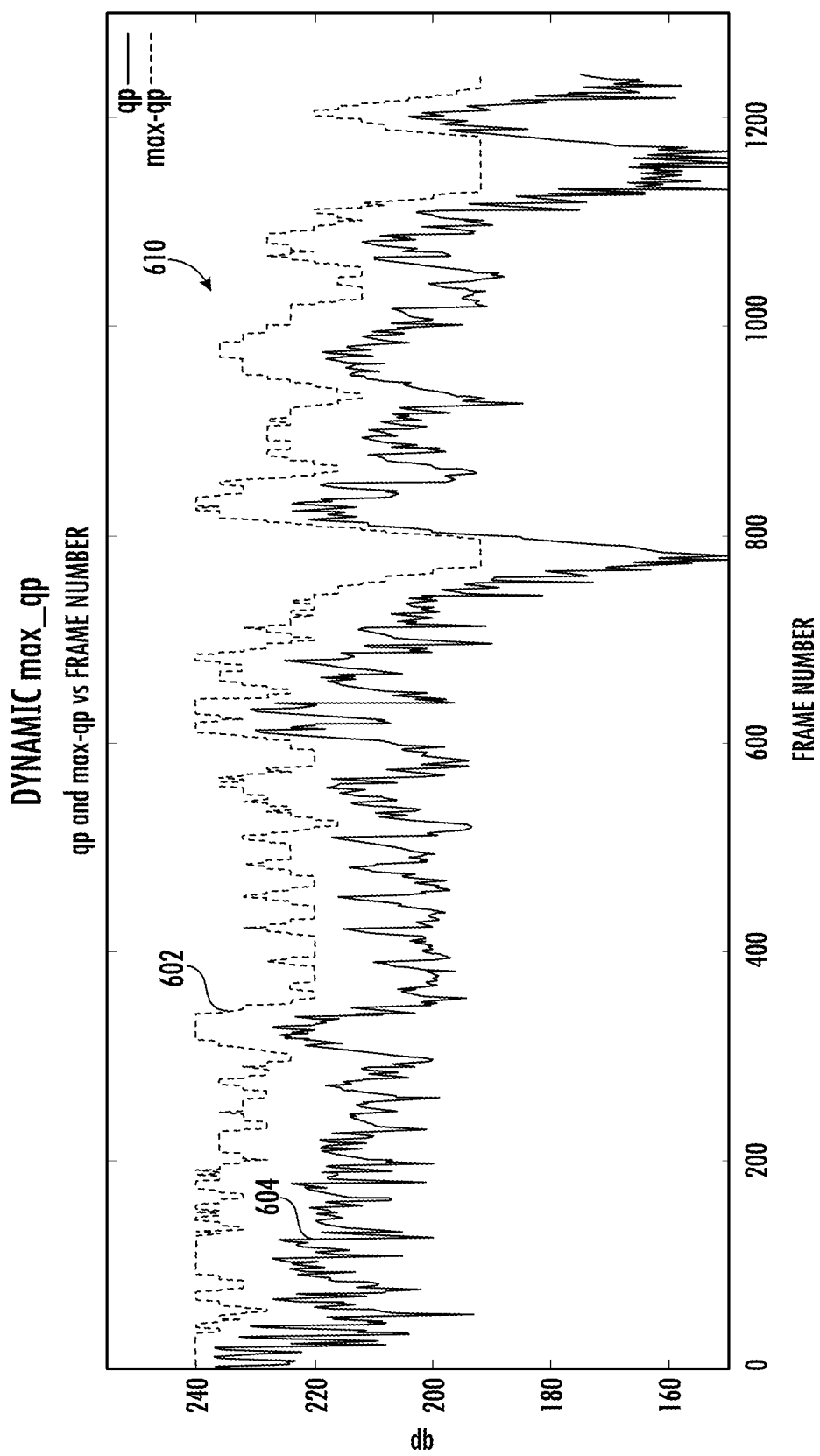
FIG. 6 depicts an example graph illustrating encoding results for processing video frames from the second test video, according to one or more example embodiments of the disclosure.

FIG. 6 depicts an example graph illustrating encoding results for processing video frames from the second test video, according to one or more example embodiments of the disclosure.

In the example of FIG. 6, a dynamic max_qp mode is implemented by the dynamic maximum quantization parameter determination module 121 where the max_qp is set according to the method disclosed herein and the maximum QP value varies. For example, the dynamic maximum quantization parameter determination module 121 may determine the range (MIN_MAX_QP, MAX_MAX_QP) to be (48, 60), set the constant a equal to 0.8, and set the constant c equal to 1.1. As can be seen from the graph 610 of FIG. 6, a differential between the QP values 604 used to encode the video frame and the dynamically changing max_qp values 602 may be sufficient so as to avoid poor quality of the video. According to the dynamic max_qp mode implemented in FIG. 6, better rate control can be achieved, resulting in less overshoot at low bit rates and a smoother video can be obtained.

Terms such as "module", and "unit," may be used herein in association with various features of the disclosure (e.g., the dynamic maximum quantization parameter determination module 121). Such terms may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Aspects of the above-described example embodiments may be recorded in computer-readable media (e.g., non-transitory computer-readable media) including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

The technology discussed herein may make reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the disclosed subject matter has been described in detail with respect to various example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the disclosed subject matter as would be readily apparent to one of ordinary skill in the art. For instance, features illustrated or described as part of one embodiment can be used with another embodiment to yield a still further embodiment. Thus, it is intended that the disclosure cover such alterations, variations, and equivalents.

What is claimed is:

1. A computer-implemented method, comprising:
   setting, by a computing device, a maximum quantization parameter (QP) value for encoding an input video frame to a value which is a maximum value between a first QP value and a second OP value, wherein:
   the first QP value corresponds to a first proportion of an application-specified maximum QP value, and
   the second QP value is determined based on another value which is a minimum value between a third QP value and a fourth QP value, wherein:

the third QP value is determined based on an average value of QP values used to encode a plurality of video frames before the input video frame, and the fourth QP value corresponds to a second proportion of the application-specified maximum QP value; and using the set maximum QP value as a quality bound for encoding the input video frame.

2. The computer-implemented method of claim 1, wherein the first proportion of the application-specified maximum QP value is less than the second proportion of the application-specified maximum QP value.

3. The computer-implemented method of claim 2, further comprising determining the third QP value based on the average value of QP values used to encode the plurality of video frames before the input video frame and a QP value for a video frame encoded immediately before the input video frame.

4. The computer-implemented method of claim 3, further comprising determining the third QP value based on a first weight applied to the average value of QP values used to encode the plurality of video frames before the input video frame and a second weight applied to the QP value for the video frame encoded immediately before the input video frame.

5. The computer-implemented method of claim 4, wherein the first weight is greater than the second weight.

6. The computer-implemented method of claim 1, further comprising determining the third QP value by:
determining an exponential moving average value of QP values used to encode the plurality of video frames before the input video frame, and
obtaining a product of the exponential moving average value of the QP values used to encode the plurality of video frames before the input video frame and a constant value which is greater than one.

7. The computer-implemented method of claim 1, wherein
the input video frame is included in a video bitstream containing a plurality of layers, and
setting, by the computing device, the maximum QP value for encoding the input video frame comprises setting, by the computing device, separate maximum QP values for encoding the input video frame with respect to each layer among the plurality of layers.

8. The computer-implemented method of claim 7, further comprising determining separate third QP values with respect to each layer among the plurality of layers, based on the average value of QP values used to encode the plurality of video frames before the input video frame and a QP value for a video frame encoded immediately before the input video frame.

9. The computer-implemented method of claim 1, wherein
the computing device is a participant computing device participating in a videoconferencing session, and
the method further comprises transmitting the encoded input video frame to at least one of a videoconferencing computing system or one or more other participant computing devices participating in the videoconferencing session.

10. A computing system, comprising:
one or more processors; and
one or more non-transitory computer-readable media that store instructions that, when executed by the one or more processors, cause the computing system to perform operations, the operations comprising:

setting, by the one or more processors, a maximum quantization parameter (QP) value for encoding an input video frame to a value which is a maximum value between a first QP value and a second QP value, wherein:
the first QP value corresponds to a first proportion of an application-specified maximum QP value, and
the second OP value is determined based on another value which is a minimum value between a third OP value and a fourth OP value, wherein
the third QP value is determined based on an average value of QP values used to encode a plurality of video frames before the input video frame, and
the fourth QP value corresponds to a second proportion of the application-specified maximum QP value, and
using the set maximum QP value as a quality bound for encoding the input video frame.

11. The computing system of claim 10, wherein the first proportion of the application-specified maximum QP value is less than the second proportion of the application-specified maximum QP value.

12. The computing system of claim 11, wherein the operations further comprise determining the third QP value based on the average value of OP values used to encode the plurality of video frames before the input video frame and a QP value for a video frame encoded immediately before the input video frame.

13. The computing system of claim 12, wherein the operations further comprise determining the third QP value based on a first weight applied to the average value of QP values used to encode the plurality of video frames before the input video frame and a second weight applied to the QP value for the video frame encoded immediately before the input video frame.

14. The computing system of claim 13, wherein the first weight is greater than the second weight.

15. The computing system of claim 10, wherein the operations further comprise determining the third QP value by:
determining an exponential moving average value of QP values used to encode the plurality of video frames before the input video frame, and
obtaining a product of the exponential moving average value of the QP values used to encode the plurality of video frames before the input video frame and a constant value which is greater than one.

16. The computing system of claim 10, wherein
the input video frame is included in a video bitstream containing a plurality of layers, and
setting, by the one or more processors, the maximum QP value for encoding the input video frame comprises setting, by the one or more processors, separate maximum QP values for encoding the input video frame with respect to each layer among the plurality of layers.

17. The computing system of claim 16, wherein the operations further comprise determining separate third QP values with respect to each layer among the plurality of layers, based on the average value of QP values used to encode the plurality of video frames before the input video frame and a QP value for a video frame encoded immediately before the input video frame.

18. The computing system of claim 10, wherein
the computing system includes a participant computing device participating in a videoconferencing session, and the operations further comprises transmitting the encoded input video frame to at least one of a videoconferencing computing system or one or more other participant computing devices participating in the videoconferencing session.

19. A computer-implemented method, comprising:

setting, by a computing device, a maximum quantization parameter (QP) value for encoding an input video frame to a value which is a maximum value between a first OP value and a second QP value, wherein:

the first QP value corresponds to a first proportion of an application-specified maximum QP value, and the second QP value is determined based on another value which is a minimum value between a third QP value and a fourth QP value, wherein:

the third QP value is determined based on an exponential moving average value of QP values associated with a plurality of video frames encoded before the input video frame, and the fourth QP value corresponds to a second proportion of the application-specified maximum QP value, the second proportion being greater than first proportion; and using the set maximum QP value as a quality bound for encoding the input video frame.

20. The computer-implemented method of claim 19, further comprising determining the third QP value by:

determining the exponential moving average value of QP values associated with the plurality of video frames encoded before the input video frame, and obtaining a product of the exponential moving average value of the QP values associated with the plurality of video frames encoded before the input video frame and a constant value which is greater than one.

* * * * *